United States Patent [19]
Boillot et al.

[11] Patent Number: 5,134,676
[45] Date of Patent: Jul. 28, 1992

[54] CONNECTOR FOR FIBER OPTICS

[75] Inventors: Laurent Boillot, Voiron; Boudard Serge, Villemonble, both of France

[73] Assignee: Radiall, Rosny-Sous-Bois, France

[21] Appl. No.: 644,955

[22] Filed: Jan. 22, 1991

[30] Foreign Application Priority Data

Jan. 29, 1990 [FR] France .................. 90 00994

[51] Int. Cl.⁵ .............................. G02B 6/38
[52] U.S. Cl. ............................ 385/72; 385/62; 385/66
[58] Field of Search ............... 350/96.15, 96.20, 96.21, 350/96.22; 385/58, 60, 62, 66, 70, 72, 73, 75

[56] References Cited

U.S. PATENT DOCUMENTS

| | | | |
|---|---|---|---|
| 4,186,998 | 2/1980 | Holzman | 350/96.21 |
| 4,221,461 | 9/1980 | Bair | 350/96.20 |
| 4,423,923 | 1/1984 | Frazier et al. | 350/96.15 |
| 4,512,630 | 4/1985 | Runge | 350/96.21 |

FOREIGN PATENT DOCUMENTS

| | | | |
|---|---|---|---|
| 0063085 | 10/1982 | European Pat. Off. | 350/96.21 X |
| 0142055 | 5/1985 | European Pat. Off. | 350/96.21 X |
| 2386060 | 10/1978 | France | 350/96.21 X |
| 2056705 | 3/1981 | United Kingdom | 350/96.21 X |
| 2138161 | 10/1984 | United Kingdom | 350/96.21 X |

Primary Examiner—Brian Healy
Attorney, Agent, or Firm—Schweitzer, Cornman & Gross

[57] ABSTRACT

The invention relates to a connector for fiber optics, having two ferrules mounted on the end of each of the fibers to be connected, each having a bore into which the fiber optic can be inserted loosely and fixed in place such that its end coincides with the end of the ferrule, and a female reconstitution coupling having a longitudinal bore to support and align the two ferrules face to face, and longitudinal pressure means to thrust each of the ferrules toward the other, characterized by the fact that it includes a separator (11) of resilient plastic material having a refractive index equal to or close to that of the core of the fibers (8) to be connected, the said separator having, prior to its installation, a thickness at least equal to the gap (e) between the ends of the confronting fibers once the connection is made, the said separator (1) being made integral with a sleeve (12) adapted to be positioned and held inside of the female reconstitution coupling.

4 Claims, 2 Drawing Sheets

CONNECTOR FOR FIBER OPTICS

BACKGROUND OF THE INVENTION

The present invention relates to a connector for fiber optics.

More precisely, the object of the invention is a connector of the type having two ferrules mounted on the end of each of the fibers to be connected and each having a bore into which the fiber optic can be inserted loosely and fixed such that its end coincides with the end of the ferrule, a female reconstitution coupling having a longitudinal bore to hold an align the two ends in abutment, and longitudinal pressure means to push each of the ferrules toward the other.

Radiall S. A. has already described, in EP-A-0063085, a connector of this type wherein the female coupling has in its central part, inside of its longitudinal bore, an abutment body for the male ferrules, particularly a sphere, having an axial through-bore and around the latter a bearing contact surface facing each of the male ferrules. Each of the male ferrules has an axial tubular protuberance which can be engaged in the bore in the abutment body, the end of the fiber coinciding with the end of the protuberance. Each of the ferrules has, set back from the protuberance and surrounding the rear portion thereof, annular recess whose wall, preferably of conical profile, defines a bearing surface for contact with the confronting bearing surface of the abutment body of the female connector, and the bearing surfaces in contact are pressed against one another by the action of longitudinal pressure means. The confronting bearing surfaces of the male ferrules are configured such that, upon any relative movement of the bearing surfaces in contact, the end of a fiber at the end face of the protuberance of a male ferrule, will be held at a constant, predetermined distance from the center of the abutment body.

The end faces of the protuberances of the ferrules and of the fibers fixed inside of them are straight, that is, perpendicular to the longitudinal axis of the connector, or they can be inclined with respect to this axis when an attenuating function is sought, as described for example in French application FR-A-2598820 of Radiall S. A.

In all cases, the end faces of the confronting fibers are not in contact with one another but are separated by a gap which, in practice, is on the order of 6 to 15 micrometers once the connection is made. In fact, a larger gap, particularly one greater than 25 micrometers, would create unacceptable losses at the connection.

There is therefore an air gap between the ends of the confronting fiber optics.

Now, the refractive index of air differs quite perceptibly from that of the core of the silica optical fibers presently used, which have a refractive index of 1.47.

In order to avoid Fresnel losses by reflection upon passing through the layer of air between the ends of the confronting fibers, it in known to replace the space between the confronting fiber ends with a product of a greasy or gel consistency called an "index gel", which has an index of refraction equal to or close to that of the core of the fibers. An example thereof is given in GS-A-2056705.

In connectors of the type described in EP-A-0063085, before putting the ferrules into the female connector, a small amount of index gel is put onto the end face of the ferrule at which the fiber is exposed, and then the ferrules are fixed in the female connector.

This method is not satisfactory because, on the one hand, it happens in practice that the technician making the connection neglects to install the index del, and on the other hand the gel tends to evaporate during use. Moreover, when the connection must be taken apart and reassembled it is necessary to clean the end faces of the ferrules so as to remove the residual gel, and then to put on another application of index gel.

The present invention proposes to eliminate the problems connected with the use of an index gel between the confronting end faces of the fibers being connected.

SUMMARY OF THE PRESENT INVENTION

The connector according to the present invention is characterized essentially by the fact that it includes a separator of resilient plastic material having an index of refraction equal to or close to that of the core of the fibers being connected, the separator having, prior to installation, a thickness at least equal to the gap between the ends of the confronting fibers once the connection is completed, the separator being made integral with a sleeve adapted to be positioned and held inside of the female reconstitution coupling.

Therefore, in accordance with the invention, the sleeve containing the separator can be set in place and fixed inside of the female coupling before making the connection. The ferrules containing the fibers are then inserted and fixed inside of the female coupling.

Under the effect of the longitudinal means for pressing the ferrules into the female coupling, the separator according to the invention is compressed between the end faces of the ferrules, thus completely filling the space between the confronting fibers and providing continuity as regards the index of refraction.

Preferably, the separator is made of a silicone elastomer.

Advantageously, the sleeve containing the separator is arranged so as to be installed with a force fit in the longitudinal bore of the female coupling or, in one particular embodiment, in the axial bore of an abutment body held in the said bore and into which the ferrule protuberances are introduced, the extremities of which coincide with the extremities of the fibers.

For this purpose, the outer wall of the sleeve advantageously has a convex, curved or biconical cross section.

Other advantages and features of the invention will appear in the reading of the description that follows of an embodiment, which is by no means restrictive, in connection with the annexed drawing.

DETAILED DESCRIPTION OF THE INVENTION

Figure 1:
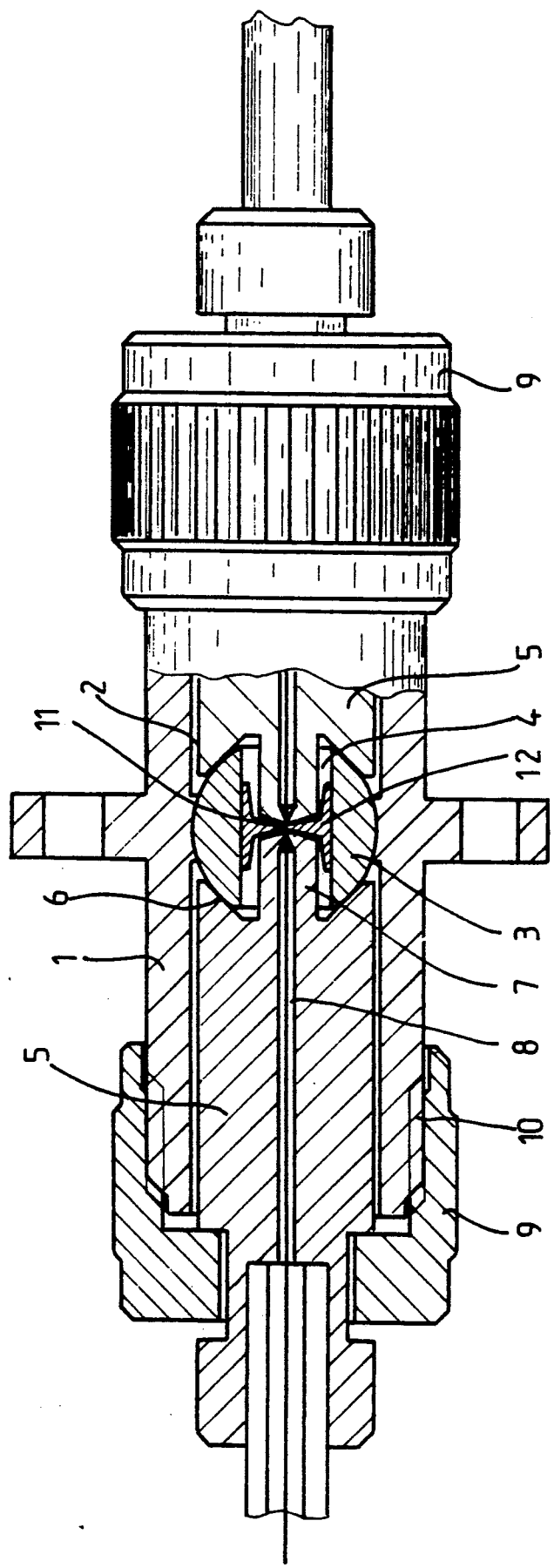
FIG. 1. shows a connector in accordance with the invention, partially in section.

The connector illustrated in FIG. 1 has the general characteristics of the connectors sold by the applicant company under the trademark OPTABALL, and described particularly in EP-A-0063085 the particulars of which are incorporated herein by reference.

The connector includes a female reconstitution coupling 1 having a longitudinal bore 2 within which is affixed a sphere 3 provide with an axial bore 4, and into which two male ferrules 5 are inserted, each having a conical bearing surface 6 thrusting against the sphere 3, and an axial protuberance 7 inside of which a fiber optic 8 is fixedly held.

Nuts 9 cooperating with female threads 10 created at the longitudinal ends of the coupling 1 constitute longitudinal pressure means axially urging each of the ferrules toward the other.

Figure 2:
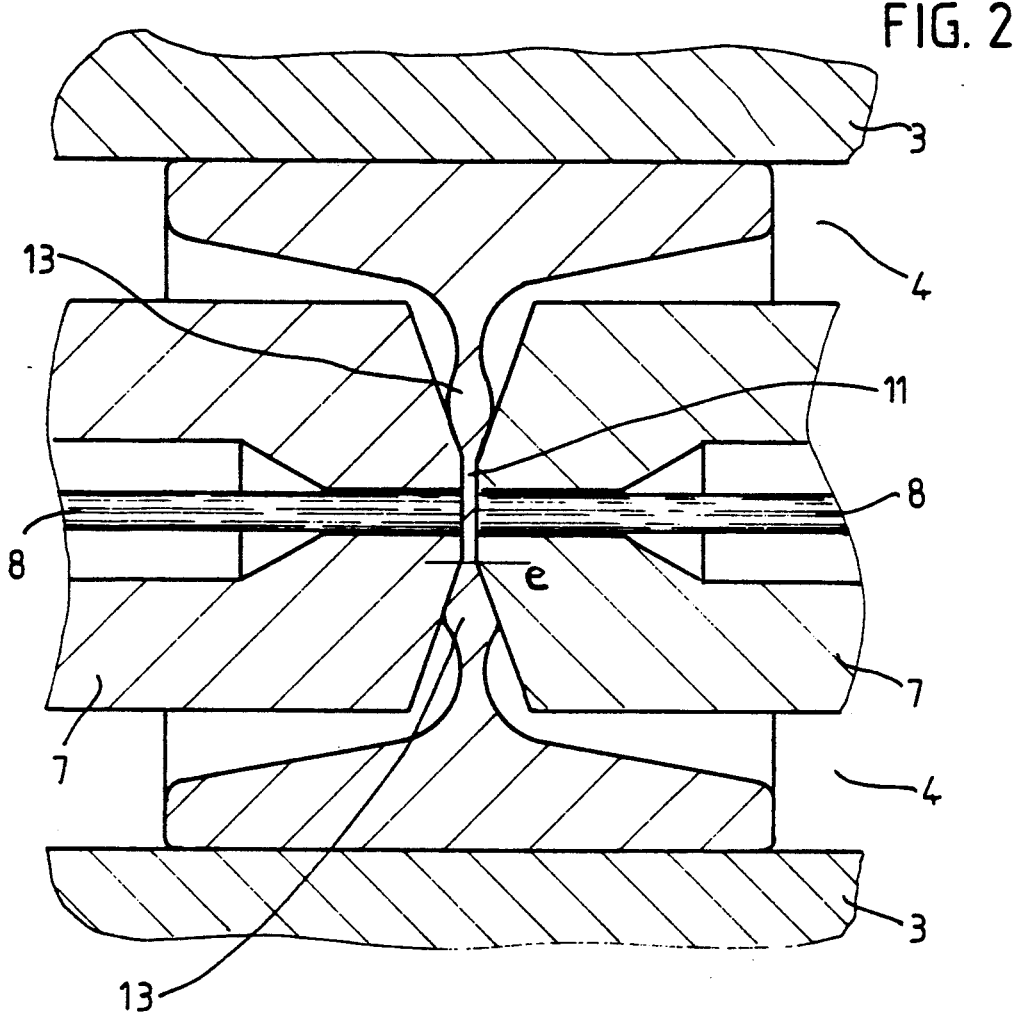
FIG. 2 is a detail in section of the connecting portion of the connector of FIG. 1.
Figure 3:
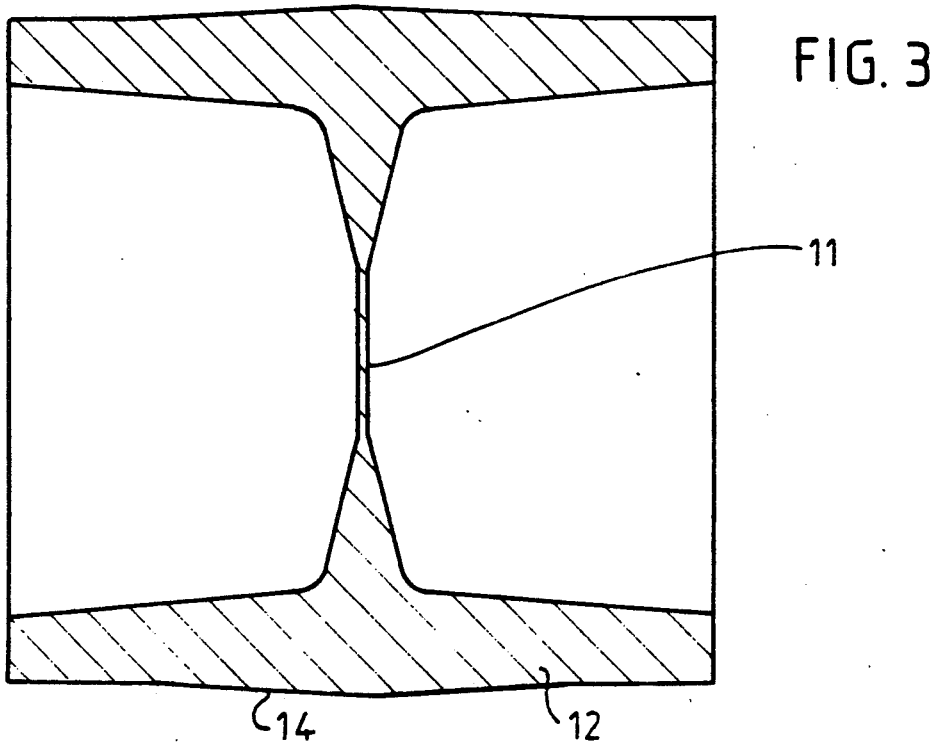
FIG. 3 is a cross section of the separator sleeve used in the connector according to the invention, prior to its installation.

In accordance with the invention, instead of the index gel conventionally used between the ends of the protuberances 7 of the male ferrules 5, a separator 11 of resilient plastic material, particularly a silicone elastomer, is installed; in one particular embodiment this separator is made in one piece with a sleeve 12 shown in FIG. 3 prior to installation, and best seen in the connecting position in FIG. 2.

In one particular embodiment a silicone elastomer is used which has a refractive index of about 1.41, separator 11 having before installation a thickness, for example, of about 20 micrometers.

When the connection is made, and to the extent to which the gap e (FIG. 2) between the confronting end faces of the protuberances 7 of the male ferrules is less than this value, amounting, for example, to between 6 and 15 micrometers, the male ferrules, thrust axially under the effect of the rotation of the nuts 9, are made to compress the separator 11, as shown in FIG. 2, thus forming an annular bulge outside of the disk-shaped portion 13 situated between the confronting end surfaces of the protuberances, which offers the advantage of creating a protective barrier against external pollutants, which are thus effectively prevented from reaching into the area of the coupling of the fibers.

As seen in FIG. 3, the outer wall 14 of the sleeve 12 has, near its central portion, a double-tapered cross section making it possible to install the sleeve 12 with a tight fit into the reconstitution coupling, viz., in the example shown, the axial through-bore 4 of the abutment body in the form of sphere 3.

In case of accidental damage to the sleeve 12, it is easy, after disengaging the ferrules, to withdraw the sleeve 12 containing the separator 11 and to replace it, without the need for operations of cleaning ferrules as was the case with the traditional index gels.

In the example shown, the confronting end faces of the ferrules and fibers are perpendicular to the axis of the connector.

It is, of course, possible to embody the invention with ferrules and fibers having end faces inclined, for example, at an angle of 11 to 15 degrees from a plane perpendicular to the axis of the connector in order to achieve attenuation or to reduce the coefficient of reflection.

The tests performed by Radiall S. A. show that, in all cases, the connection losses measured employing a separator in accordance with the invention are substantially the same as those found when an index gel having the same index of refraction is used, and appreciably lower than the losses and coefficients of reflection measured when a layer of air is present between the confronting end faces of the fibers.

Although the invention has been described in connection with a particular embodiment, it is quite evident that it is by no means limited thereto, and that different variants and modifications may be made thereto without departing from its scope or its spirit. In particular it should be understood that the invention is not limited to the means described in the example (sphere in the female coupling and conical bearing surfaces on the ferrules) for the purpose of positioning the ferrules when the connection is made.

We claim:

1. A connector for fiber optics having two ferrules mounted on the end of each of the fibers to be connected, each having a bore into which the fiber optic may be inserted loosely and fixed in place such that its end coincides with the end of the ferrule, and a female reconstitution coupling having a longitudinal bore for supporting and aligning the two confronting ferrules, and longitudinal pressure means to thrust each of the ferrules toward the other, characterized by the fact that the connector substantially includes a separator (11) of resilient plastic material having a refractive index equal to or close to that of the core of the fibers (8) to be connected, said separator having, prior to its installation, a thickness at least equal to the gap (e) between the ends of the confronting fibers once the connection is made, said separator being integral with a sleeve (12) adapted to be positioned and held inside of a female reconstitution coupling whereby said separator may be removed and replaced without damage to said fibers.

2. A connector according to claim 1, characterized by the fact that the separator (11) is made of silicone elastomer.

3. A connector according to claim 1, characterized by the fact that the exterior wall (14) of said sleeve (12) has a convex, curved or biconical section.

4. A connector according to claim 1 in which there is provided an abutment body held in the longitudinal bore of the female coupling and having an axial bore into which protuberances at the ends of the ferrules are introduced and with the end of which the ends of the fibers coincide, characterized by the fact that the said sleeve (12) is force-fitted into the said axial bore (4) of the said abutment body (3).

* * * * *